United States Patent [19]

Takamatsu et al.

[11] Patent Number: 4,593,977
[45] Date of Patent: Jun. 10, 1986

[54] CELL CONSTRUCTION FOR COLOR LIQUID CRYSTAL DISPLAY DEVICES

[75] Inventors: Toshiaki Takamatsu, Tenri; Fumiaki Funada, Yamatokoriyama; Masataka Matsuura, Tenri; Tatuo Uchida, Sendai, all of Japan

[73] Assignee: Sharp Kabushiki Kaisha, Osaka, Japan

[21] Appl. No.: 746,764

[22] Filed: Jun. 20, 1985

Related U.S. Application Data

[63] Continuation of Ser. No. 415,908, Sep. 8, 1982, abandoned.

[30] Foreign Application Priority Data

Sep. 14, 1981 [JP] Japan ................. 56-146505
Sep. 14, 1981 [JP] Japan ................. 56-146506

[51] Int. Cl.$^4$ ............................................. G02F 1/13
[52] U.S. Cl. ........................... 350/339 F; 350/333; 350/341
[58] Field of Search ................. 350/340, 341, 339 F, 350/333

[56] References Cited

U.S. PATENT DOCUMENTS

| | | | |
|---|---|---|---|
| 3,941,901 | 3/1976 | Harsch | 350/341 X |
| 3,967,882 | 7/1976 | Kubota et al. | 350/341 |
| 4,391,491 | 7/1983 | Freer et al. | 350/341 |
| 4,405,208 | 9/1983 | Shirai | 350/341 |

FOREIGN PATENT DOCUMENTS

| | | | |
|---|---|---|---|
| 0023421 | 2/1981 | European Pat. Off. | 350/339 F |
| 2809335 | 9/1978 | Fed. Rep. of Germany | 350/341 |
| 0025174 | 3/1981 | Japan | 350/339 F |

*Primary Examiner*—John K. Corbin
*Assistant Examiner*—Richard F. Gallivan
*Attorney, Agent, or Firm*—Birch, Stewart, Kolasch & Birch

[57] ABSTRACT

A color liquid crystal display device as disclosed uses a color filter in a liquid crystal cell in which a layer of a polymide resin for orientation of liquid crystal molecules is provided to cover the color filter or the orientation layer of liquid crystal molecules contains a dye or like coloring substance to form a combined orientation and color filter layer.

4 Claims, 8 Drawing Figures

CELL CONSTRUCTION FOR COLOR LIQUID CRYSTAL DISPLAY DEVICES

This application is a continuation of application Ser. No. 415,908, filed on Sept. 8, 1982, abandoned.

BACKGROUND OF THE INVENTION

1. Field of the Invention

This invention relates to a color liquid crystal display device comprising a color filter in a liquid crystal cell.

2. Description of the Prior Art

There are known various types of color display systems for liquid crystal display devices. For example, the DAP system utilizes the birefringence of liquid crystal molecules. According to the twisted nematic system, a color polarizer is employed as one of the polarizers, or a color filter is provided for a netural polarizer. The quest-host system employs a dichroic dye in a liquid crystal layer.

According to the DAP system, the inclination of liquid crystal molecules is controlled by application of an electric field, and various colors can be reproduced by the interference of light passing through a liquid crystal cell. The practical use of this system is, however, hindered by a number of factors, including the high level of technique which is required for controlling the cell thickness, and the dependence of the color on the viewing angle.

A system employing a color polarizer or a color filter is considerably better than the DAP system. The color of the display is not so influenced as in the case of the DAP by variation in the cell thickness. The dependence of the color on the viewing angle is considerably improved, and a multi-color display is easy to achieve by a single cell. There is no vagueness of color by parallax. The guest-host system is also substantially free from any problem such as cell thickness control, and the dependence of color on the viewing angle.

In a conventional color liquid crystal display device including a color filter in a liquid crystal cell, however, a layer of polyvinyl alcohol is employed for the orientation of liquid crystal molecules (The 28th Spring Meeting of Japan Society of Applied Physics —30a-Y-10). As polyvinyl alcohol is soluble in water, it is deteriorates, and fails to be capable of proper molecule orientation in the case of water invasion in the cell during a long time of use. The cell requires a complicated process for manufacture, and is costly, since a layer of polyvinyl alcohol has to be formed on a color filter.

SUMMARY OF THE INVENTION

This invention provides a multicolor liquid crystal display device of, for example, the twisted nematic or quest-host system including a color filter in a liquid crystal cell, characterized by comprising a layer of a polyimide resin formed at least on the color filter for orientation of liquid crystal molecules. This layer does not lose its capability for molecular orientation even if it is exposed to moisture.

According to another aspect of this invention, there is provided a novel and useful color liquid crystal display cell comprising a molecular orientation layer and a color filter layer being formed as one layer by incorporating a dye or like coloring substance into the orientation layer.

BRIEF DESCRIPTION OF THE DRAWINGS

FIGS. 1 to 4 illustrate color liquid crystal display devices embodying this invention, and are characterized by including a polyimide resin layer for liquid crystal orientation formed on a color filter; and FIGS. 5 to 8 illustrate color liquid crystal display devices embodying this invention, and characterized by including a combined color filter and liquid crystal orientation layer.

DESCRIPTION OF THE PREFERRED EMBODIMENTS

Figure 1:
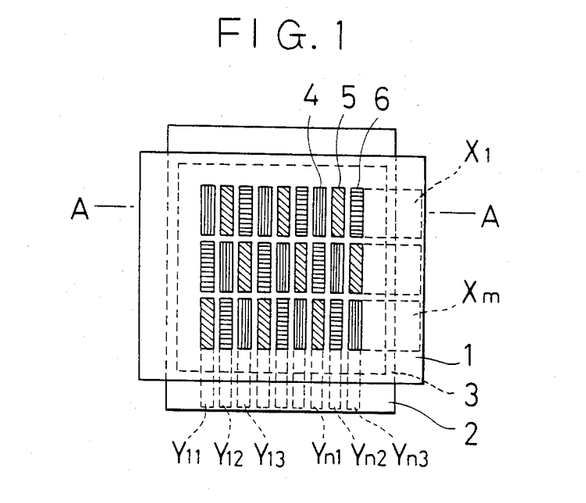
FIG. 1 is a top plan view of a color liquid crystal display device comprising a three-color liquid crystal cell having a matrix electrode structure according to a transmission twisted nematic system.
Figure 2:
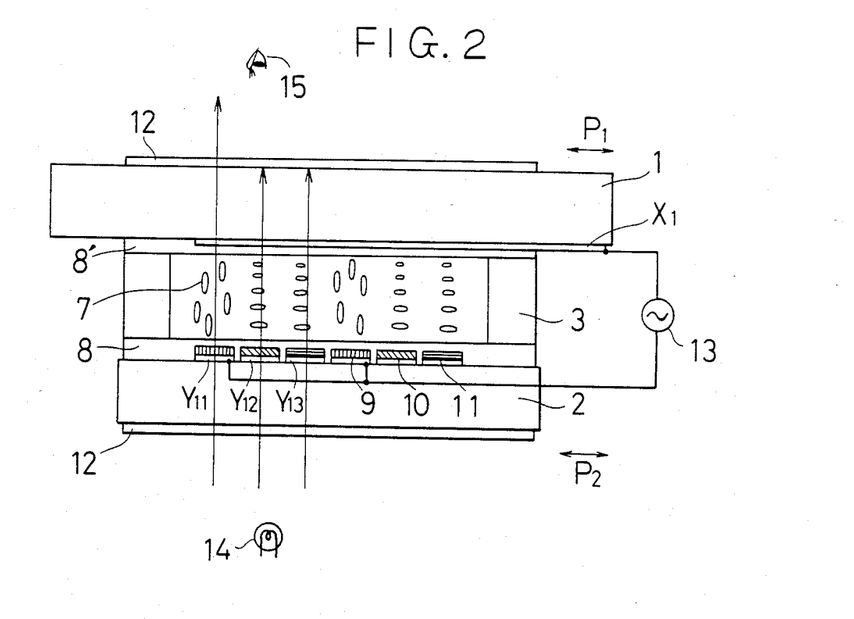
FIG. 2 is a sectional view taken along the line A—A of FIG. 1.

Referring to FIGS. 1 and 2 of the drawings, scanning electrodes (X electrodes) $X_1$, $X_2$... and $X_m$ each composed of a transparent conductive layer are formed on a substrate 1 by photoetching or otherwise, and signal electrodes (Y electrodes) $Y_{11}$, $Y_{12}$, $Y_{13}$, $Y_{21}$, $Y_{22}$... $Y_{n1}$, $Y_{n2}$ and $Y_{n3}$, which are likewise composed of a transparent conductive layer, are formed on a substrate 2. m and n are both a multiple of 3. The X electrodes have a width which is slightly over three times greater than that of the Y electrodes. The X and Y electrodes cross each other to form a matrix electrode structure. The intersections of the X and Y electrodes define picture elements for a display. A red filter 9 is provided on the Y electrode corresponding to the picture elements ($X_m$, $Y_{13}$), ($X_m$, $Y_{23}$), ... and ($X_m$, $Y_{n3}$) on the m-th line from the picture elements ($X_1$, $Y_{11}$), ($X_1$, $Y_{21}$), ... and ($X_1$, $Y_{n1}$) on the first line, a green filter 10 on the Y electrode corresponding to the picture elements ($X_m$, $Y_{11}$), ($X_m$, $Y_{21}$), ... and ($X_m$, $Y_{n1}$) on the m-th line from the picture elements ($X_1$, $Y_{12}$), ($X_1$, $Y_{22}$), ... and ($X_1$, $Y_{n2}$) on the first line, and a blue filter 11 on the Y electrode corresponding to the picture elements $(X_m, Y_{12})$, $(X_m, Y_{22})$, . . . and $(X_m, Y_{n2})$ on the m-th line from the picture elements $(X_1, Y_{13})$, $(X_1, Y_{23})$, . . . and $(X_1, Y_{n3})$ on the first line.

The color filters 9, 10 and 11 are formed as hereinafter described. Transparent color inks are selected from TABLE 1 showing NAZ-DAR 9000-series screen process inks (products of NAZ-DAR COMPANY INTERNATIONAL), and the Y electrodes are printed with those inks. They are, however, merely examples of the inks which can be employed in accordance with this invention.

TABLE 1

| Color # | Name |
| --- | --- |
| 9081 | PMS warm red |
| 9082 | PMS rubine red |
| 9083 | PMS rhodamine red |
| 9085 | PMS reflex blue |
| 9086 | PMS process blue |
| 9087 | PMS green |

(PMS = Pantone Matching System)

According to the embodiment shown in FIGS. 1 and 2, colors #9083 (red), 9087 (green) and 9086 (blue) are employed. Red, green and blue inks are printed one after another on predetermined electrodes by screen printing, and heat-treated at about 300° C. for two hours in an oven, whereby the red, green and blue filters 9, 10 and 11 are formed on the Y electrodes. Picture elements 4 have a red color, picture elements 5 a green color, and picture elements 6 a blue color.

A layer 8 for the orientation of liquid crystal molecules is superposed on the color filters 9 to 11. It is formed from a film of a polyimide resin (PiX #5400 of HITACHI CHEMICAL INDUSTRIAL CO., LTD., Japan).

The polyimide resins to be employed for the orienting layer of the color liquid crystal display device in this invention include so-called the polyimide resins, e.g., those disclosed in Japanese Unexamined Patent Publication Nos. 65960/1976, 30859/1979 and 133359/1979, or in U.S. patent application Ser. No. 230,541 filed on Feb. 2, 1981 U.S. Pat. No. 4,405,208. The preferable polyimide resin is a polyimide-siloxane resin which may be produced by copolymerizing, in an organic solvent, diaminosiloxane having the formula (I):

(I)

wherein R is a bivalent organic group, R' is a monovalent organic group and x is an integer from 1 to 4, with a diamine having the formula (II):

$$H_2N-Q-NH_2 \quad (II)$$

wherein Q is a bivalent organic group free from silicon atom, and a tetracarboxylic acid dianhydride having the formula (III)

(III)

wherein R'' is a tetravalent organic group, to yield a polyamido acid-siloxane copolymer resin, and heating it to occur an internal condensation.

In the above mentioned formula (I), representative examples of the group R are alkylene groups such as methylene, ethylene, propylene, butylene, amylene, methylpropylene or hexylene group; alkenylene groups such as vinylene or propenylene group; arylene groups such as phenylene, naphthylene, phenanthrylene, anthrylene, indenylene, biphenylene, methylphenylene, dimethylphenylene, trimethylphenylene, ethylphenylene, chlorophenylene, aminophenylene or 1,2,4,5,-tetramethylphenylene group; aralkylene groups such as benzylidene, styrylidene, cinnamylidene, cuminylidene, phenylethylene, phenylpropylene, phenylbutylene or naphtylethylene group; cycloalkylene groups such as cyclopropylene, cyclobutylene, cyclopentylene, cyclohexylene, cyclopentylidene, cyclohexylidene or cycloheptylidene group; heterocyclic alkylene groups such as furfurylidene, indolylidene group; halo-alkylene group such as tetrafluoroethylene or monobromobutylen; or other groups such as $-CH_2CH_2NHCH_2-$, $-CH_2OCH_2CH_2CH_2-$, $-CH_2CH_2SCH_2CH_2-$ or $-CH_2CH_2NHCH_2CH_2CH_2-$. Also, representative examples of the group R' are alkyl, alkenyl or aryl groups such as methyl, ethyl, butyl, octyl, vinyl, alkyl, phenyl, xylyl, naphthyl or tolyl group; haloalkyl, haloalkenyl or haloaryl group such as 3,3,3-trifluoropropyl, chlorophenyl, bromophenyl, γ-chlorobutyl or dichlorophenyl group: hydrolyzable organic groups such as alkoxy, aryloxy or acyloxy group (for example methoxy, isopropoxy, butoxy, phenoxy, acetoxy, propionyloxy or benzoyloxy group).

Preferred examples of the diaminosiloxane (I) are;

Representative examples of the diamine (II) are m-phenylenediamine, p-phenylenediamine, 4,4'-diamino-diphenylpropane, 4,4'-diamino-diphenylmethane, benzidine, 4,4'-diamino-diphenylsufide, 4,4-diamino-diphenylsulfone, 3,3'-diamino-diphenylsulfone, 4,4'-diamino-diphenylether, 2,6-diamino-pyridine, bis(4-aminophenyl)phosphine oxide, bis(4-aminophenyl)-N-methyl amine, 1,5-diamino-naphthalene, 3,3'-dimethyl-4,4'-diamino-biphenyl, 3,3'-dimethoxybenzidine, 2,4-bis(α-amino-t-butyl)toluene, bis-(p-β-amino-t-butylphenyl)ether, p-bis(2-methyl-4-aminophenyl)benzene, p-bis-(1,1-dimethyl-5-aminopentyl)benzene, m-xylylenediamine, p-xylylenediamine, bis(p-aminocyclohexyl)methane, ethylenediamine, propylenediamine, hexamethylenediamine, heptamethylenediamine, octamethylenediamine, nonamethylenediamine, decamethylenediamine, 3-methyl-heptamethylenediamine, 4,4'-dimethyl-heptamethylenediamine, 2,11-diaminododecane, 1,2-bis(3-aminopropoxy)ethane, 2,2-dimethylpropylene diamine, 3-methoxy-hexamethylenediamine, 2,5-dimethyl-hexamethylenediamine, 5-methyl-nonamethylene diamine, 1,4-diaminocyclohexane, 1,12-diamino-octadecane or 2,5-diamino-1,3,4-oxadiazole.

Other examples of the group Q in the diamine (II) are ethylene, propylene, hexylene, ethyleneoxyethylene, ethyleneoxypropylene, propyleneoxypropylene, phenylene, naphtylene, biphenylene or anthrylene group or a group of the formula:

wherein m is an integer from 1 to 10.

In the formula (III), examples of the group R'' are those represented by the formulas:

Representative examples of the tetracarboxylic acid dianhydride (III) are pyromellitic acid dianhydride, mellitic acid dianhydride, 2,3,6,7-naphthalenetetracarboxylic acid dianhydride, 1,2,5,6-naphtalenetetracarboxylic acid dianhydride, 3,3',4,4'-diphenyltetracarboxylic acid dianhydride, 3,3',4,4'-diphenylmethanetetracarboxylic acid dianhydride, bis(3,4-dicarboxyphenyl)ether dianhydride, bis(3,4-dicarboxyphenyl)sulfone dianhydride, 3,3',4,4'-benzophenonetetracarboxylic acid dianhydride, 2,3,6,7,-anthracenetetracarboxylic acid dianhydride, 1,2,7,8-phenanthrenetetracarboxylic acid dianhydride, 2,3,6,7,-naphtalenetetracarboxylic acid dianhydride, 2,3,8,9-chrysenetetracarboxylic acid dianhydride, 2,3,6,7-triphenylenetetracarboxylic acid dianhydride, 3,4,9-perylenetetracarboxylic acid dianhydride, 1,2,7,8-coronenetetracarboxylic acid dianhydride, 1,8,4,5-napthtalenetetracarboxylic acid dianhydride or the like.

Furthermore, the compounds (I), (II) and (III) may be used in their respective admixture.

In the copolymerization of the compounds (I), (II) and (III), in an organic solvent, the molar ratio of (I) plus (II):(III) is suitable to about 1:1, in order to obtain a final product having a desirable structure of polyimide ring. In case where said molar ratio is outside the above range, the resulting orienting film will be insufficient in heat resistance, insulating properties and orientation. Also, the molar ratio of (I) and (II) to be used in the copolymerization is suitable to be 0.5:9.5-2.0:8.0, preferably 1:9. When a quantity of diaminosiloxane (I) is less, the resulting orienting film will lack sufficient abrasion resistance. On the other hand, in case where a quantity of (I) is large, the resulting orienting film will be insufficient to heat resistance.

The reaction conditions of the copolymerization and the organic solvent are suitably selected and utilized from those known in the arts.

The resulting polyamido acid-siloxane copolymer believed to be composed by the following two unit structures:

or

Upon heating of the polyamido acid-siloxane copolymer, it is internally condensed to form the desired polyimide-siloxane copolymer resin, which is believed to be composed by the following two unit structures:

or

Further, Pix #5400 as mentioned before is a kind of the polyimide-siloxane resin as prepared from Also, commercially available polyimide resins are PiB, PiQ, KJR (these three series are provided from HITACHI CHEMICAL INDUSTRIAL CO., Ltd., Japan), and Torayneece SP-710 and Torayneece SP-X11 of TORAY INDUSTRIES INC., Japan.

As the orientation layer 8 must be thin and uniform, it is formed by spinning from a solution of the resin in a solvent, such as N-methylpyrrolidone, and containing a fluorine-containing surface active agent, for example, FC-431 of SUMITOMO 3M COMPANY, Japan. The layer 8 can also be formed by off-set roller painting. In an oven, the polyimide resin is heated preliminarily at 60° C. for five minutes, dried at 150° C.±20° C. for an hour, and baked at about 300° C. for 30 minutes, and the resin surface to be brought into contact with the liquid crystal is rubbed with a polishing cloth, whereby the orientation layer 8 is prepared on the substrate 2. Another orientation film 8' is formed on the inner surface of the substrate 1. It is also formed from a polyimide resin film which is not affected by water, and therefore, does not decrease its orientation capability even in the case of water invasion in the liquid crystal cell.

It is alternatively possible to form the orientation layer 8' on the substrate 1 from any other inorganic material, while the layer 8 on the color filters 9 to 11 is formed from a polyimide resin.

The substrate 1 and the substrate 2 are joined to each other by a sealing material 3 applied to the bases along their edges, and cured by heating in an oven. The sealing material 3 may be an epoxy resin, for example, NX024 of SUMITOMO 3M COMPANY, Japan. The hollow space defined by the substrates 1 and the sealing material 3 is filled with a liquid crystal 7 by vacuum injection, or otherwise.

The device further includes a polarizer 12, a power source 13, and a light source 14. If the power source 13 applies an electric field to the liquid crystal 7 through the X and Y electrodes, the light emitted by the light source 14 and passing through the polarizer 12 and the liquid crystal 7 provides a viewer 15 with a red, green or blue pattern corresponding to the picture elements 4, 5 or 6. If a pair of polarizers 12 are employed as indicated at $P_1$ and $P_2$, the liquid crystal 7 of the twisted nematic construction functions as a light shutter under the influence of an electric field. If, for example, an electric field is applied to the Y electrodes $Y_{11}$, $Y_{21}$, . . . , and the X electrode $X_1$, only the light passing through the red filter 9 reaches the viewer 15, and a display is formed by red dots on the black background. If an electric field is applied to an appropriately selected combination of the X and Y electrodes, it is possible to obtain a display having a color corresponding to the selected picture elements.

Figure 3:
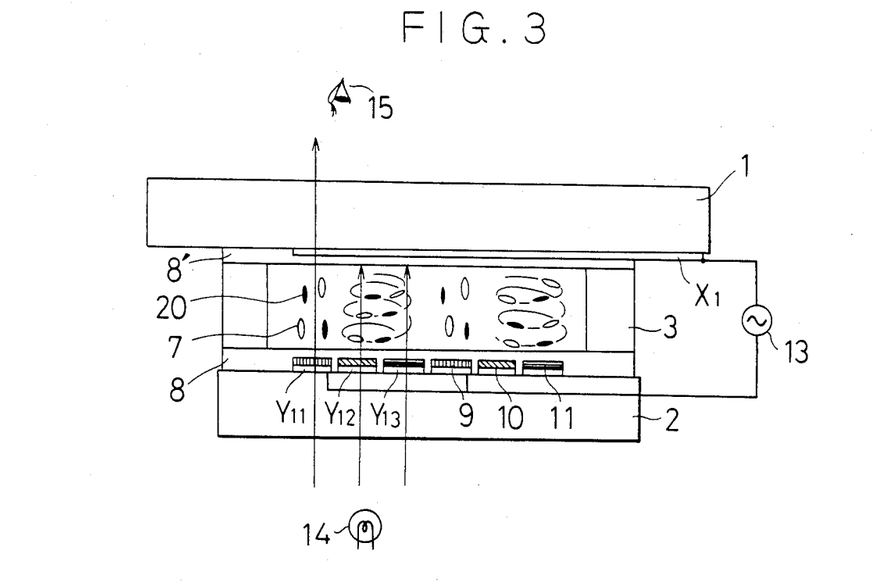
FIG. 3 is a sectional view of a color liquid crystal display device comprising a three-color liquid crystal cell having a matrix electrode structure according to the transmission and a White Taylor type quest-host system.

Referring to FIG. 3, there is shown a device comprising a three-color liquid crystal cell having a matrix electrode structure according to the transmission and White Taylor type guest-host system. The same reference numerals as those used in FIGS. 1 and 2 are used to designate like parts and components in FIG. 3. Red, green and blue filters 9, 10 and 11 on the Y electrodes are obtained from transparent inks by printing and baking in the same way as those shown in FIGS. 1 and 2. Polyimide resin orientation layers 8 and 8' are formed on the inner surfaces of substrates 2 and 1, respectively, and liquid crystal molecules are homogeneously oriented between the layers 8 and 8'. The liquid crystals 7 comprise cholesteric crystals as a host, and a dichroic dye composed of a mixture 20 of cyanine, Magenta and yellow dyes as a guest.

In the absence of any electric field application, the whole surface of the device presents a black color, since the dye 20 achieves the maximum absorption of light. Upon application of an electric field to particular picture elements, the corresponding liquid crystal molecules and dye 20 are aligned homeotropically, and the dye almost completely ceases to absorb light. Accordingly, it is possible to see the colors of the color filters 9 to 11 under the liquid crystals 7. If an electric field is applied to an appropriately selected combination of the X and Y electrodes, it is possible to obtain a display having a color corresponding to the selected picture element combination just like the device of FIGS. 1 and 2.

Figure 4:
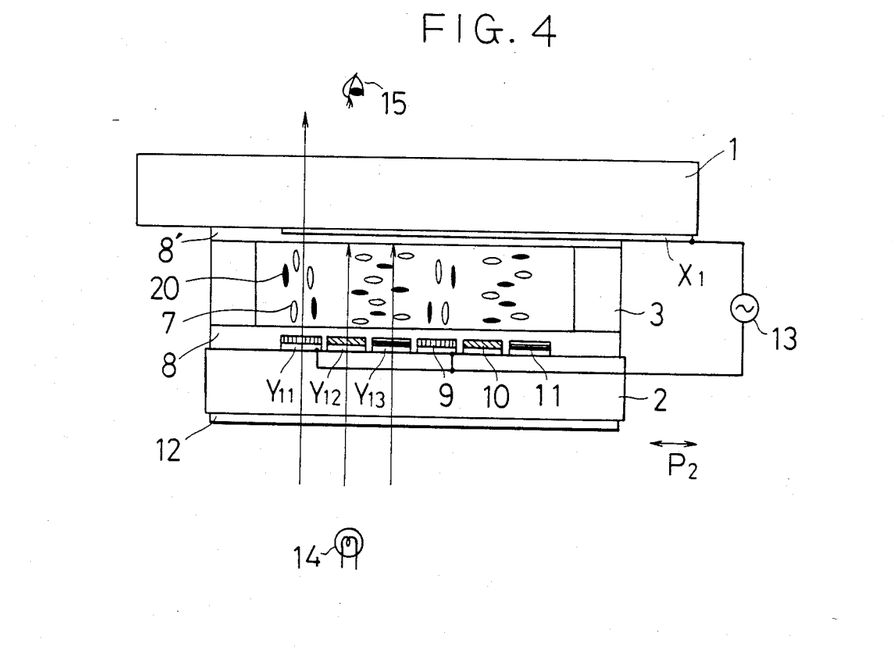
FIG. 4 is a sectional view of a color liquid crystal display device comprising a three-color liquid crystal cell having a matrix electrode structure according to the transmission and a Heilmeier type quest-host system.

FIG. 4 shows a device comprising a three-color liquid crystal cell having a matrix electrode structure according to the transmission and Heilmeier type guest-host system. The same numerals as those used in FIGS. 1 to 3 are used to designate like parts and components in FIG. 4. Red, green and blue filters 9 to 11 are formed on the Y electrodes, and orientation layers 8 and 8' are formed on the color filters 9 to 11, and the X electrodes, respectively. Liquid crystals 7 comprise nematic crystals as a host, and a dichroic dye 20 incorporated as a guest, and consisting of a mixture of cyan, Magenta and yellow dyes.

In the absence of any electric field, the device presents a totally black color, since the liquid crystal molecules are aligned homogenerously, and the dye 20 achieves the maximum absorption of light. If an electric field is applied to particular picture elements, the corresponding liquid crystal molecules and dye are aligned homeotropically and it is possible to see the colors of the filters 9 to 11 under the liquid crystals 7.

In any of the embodiments shown in FIGS. 1 to 4, it is alternatively possible to provide the color filters on the X electrodes. This invention is not limited to a transmission type liquid crystal cell, but also applicable to a reflective type cell. This invention is not limited to an XY matrix display system, but also applicable to a segment display system. The number of the colors is not limited to three, but may also be two, or four or more. It is, for example, possible to form easily a display of a bar graph in two or more colors.

The color liquid crystal display device of this invention is highly reliable, and stable in operation for a long period of time. The liquid crystal cells of this invention did not show any deterioration in orientation for more than 10 days as a result of high temperature and humidity tests at 60° C. and 90% RH(relative humidity). Comparative devices having an orientation layer formed from polyvinyl alcohol showed deterioration in the orientation of crystals within several days of tests under the same conditions.

Figure 5:
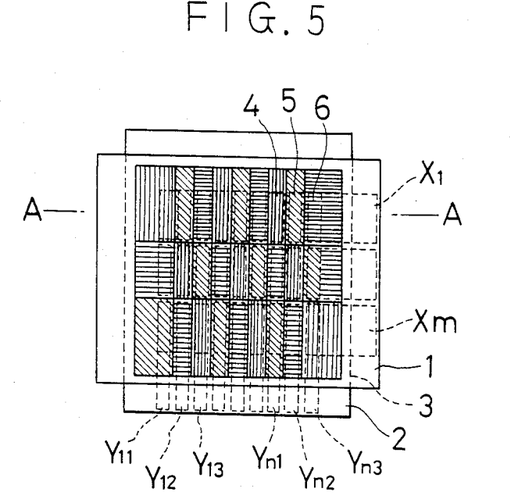
FIG. 5 is a top plan view of a color liquid crystal display device comprising a liquid crystal cell having a matrix electrode structure according to the transmission twisted nematic system, and including a simultaneously formed color filter and liquid crystal orientation layer.
Figure 6:
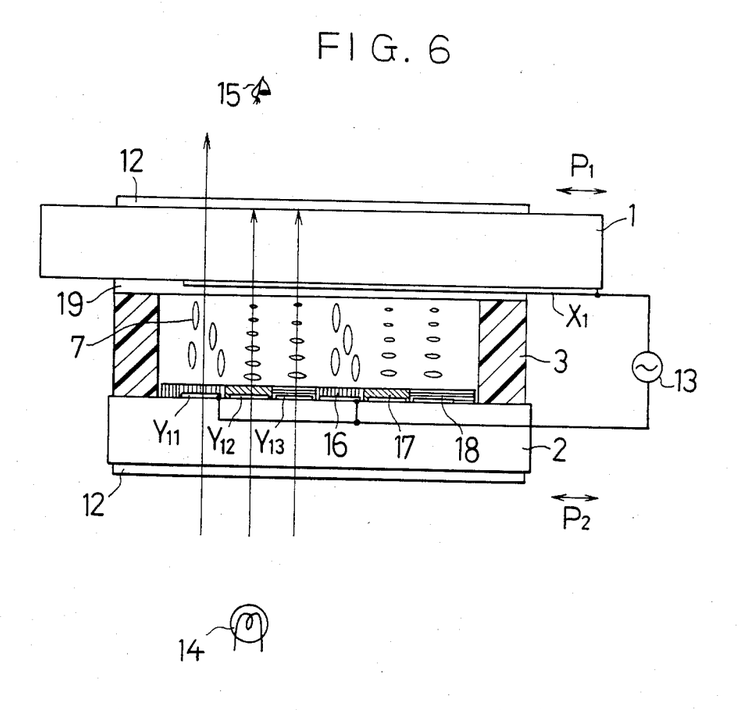
FIG. 6 is a sectional view taken along the line A—A of FIG. 5.

Referring now to FIGS. 5 and 6, there is shown a device comprising a liquid crystal cell having a matrix electrode structure according to the transmission twisted nematic system. The same numerals as those used in FIGS. 1 and 2 are used to designate like parts in FIGS. 5 and 6. Color filters 16 to 18 are, however, formed from transparent inks selected from TABLE 1, and incorporated into the materials forming an orientation layer. TABLE 1, however, shows merely examples of the applicable inks. It is alternatively possible to use, for example, dyes as shown in TABLE 2.

TABLE 2

| KODAK CAT # | Name |
| --- | --- |
| C770 | Congo Red |
| C624 | Brilliant Green |
| C1264 | Malachite Green |
| C573 | Methylene Blue |
| C8679 | Nile Blue A |

According to the embodiment shown in FIGS. 5 and 6, three color printing inks are prepared by selecting inks #9083 (red), #9087 (green) and #9086 (blue) from TABLE 1, and mixing them with a polyimide resin PiX #5400 (HITACHI CHEMICAL INDUSTRIAL CO., LTD., Japan) so that each resulting mixture may contain 30% by weight of one ink. The inks are applied by screen or offset printing to the prescribed picture elements on the Y electrodes. Althogh it is preferable to employ a polyimide resin for the orientation layer into which the inks are incorporated, it is also possible to use any other apporpriate organic material. The inks are heat-treated at about 300° C. for two hours in an oven, and then, the ink surface is rubbed with a polishing cloth, or the like. The color filters 16 to 18 are, thus, formed on the Y electrodes, and also serve for the orientation of the liquid crystal molecules.

No color printing ink need to be applied to the X electrodes. After forming the transparent electrode pattern, a layer of a polyimide resin, or any other high polymer is applied to the entire surface thereof by screen or offset printing, or spinning, and baked, and the resin surface is rubbed with a polishing cloth, whereby an orientation layer 19 is formed on the X electrodes.

The substrate 1 and the substrate 2 are joined to each other by a sealing material 3 disposed therebetween along their edges, and cured by heating in an oven. The sealing material may, for example, an epoxy resin NX024 of SUMITOMO 3M COMPANY, Japan. The hollow space defined by the substrates 1 and 2 and the sealing material 3 is filled with liquid crystals 7 by vacuum injection, or otherwise.

The liquid crystal cell shown in FIGS. 5 and 6 include a color filter layer which also serves as a layer for orientation of liquid crystal molecules. If the power source 13 applies an electric field to the liquid crystals 7 through the X and Y electrodes, the light emitted by the light source 14 and passing through the polarizer 12 and the liquid crystal cell provides the viewer 15 with a red, green or blue pattern corresponding to the picture elements 4, 5 or 6. In the event a pair of polarizers 12 are provided in parallel to each other as indicated at $P_1$ and $P_2$, the liquid crystals 7 of the twisted nematic structure function as a light shutter. If, for example, an electric field is applied to the Y electrodes $Y_{11}, Y_{12}, \ldots$, and the X electrode $X_1$, only the light passing through the red filter 16 reaches the viewer 15. If an electric field is applied to an appropriately selected combination of the X and Y electrodes, it is possible to obtain a display having a color corresponding to the selected picture elements. The color filters 16 to 18 also extend over the glass substrate, and the liquid crystal molecules remain homeotropically aligned in those gaps. Accordingly, light is cut by the polarizer 12 closer to the viewer 15, and does not reach him.

Figure 7:
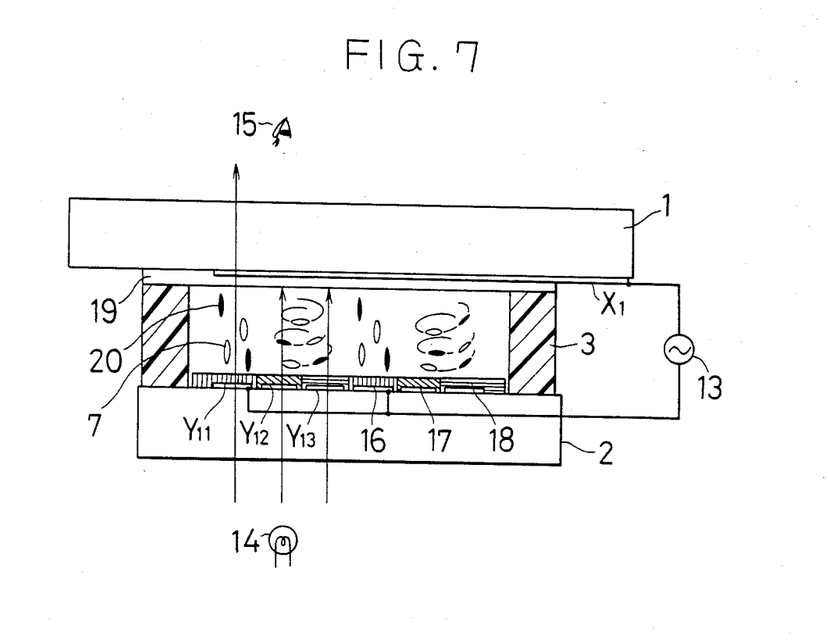
FIG. 7 is a sectional view of a color liquid crystal display device comprising a liquid crystal cell having a matrix electrode sturcture according to the transmission and a White Taylor type quest-host system, and including a combined color filter and liquid crystal orientation layer.

FIG. 7 shows a device comprising a liquid crystal cell having a matrix electrode structure according to the transmission and White Taylor type quest-host system. The same numerals as those used in FIGS. 5 and 6 are used to designate like parts in FIG. 7. Combined orientation and color filter layers 16 (red), 17 (green) and 18 (blue) are formed on the Y electrodes in accordance with the procedures hereinabove described with reference to FIGS. 5 and 6. An orientation layer 19 is formed from a polyimide resin, or any other high polymer on the X electrodes. The liquid crystals 7 filling the cell comprise cholesteric crystals as a host, and dichroic dye 20 incorporated as a guest, and composed of a mixture of cyanine, Magenta and yellow dyes.

In the absence of any electric field, the cell presents a totally black display, since the dye 20 achieves the maximum absorption of light. If an electric field is applied to particular picture elements, the corresponding liquid crystal molecules and dye are homeotropically aligned, and the dye almost completely ceases to absorb light. It is, therefore, possible to see the colors of the color filters 16 to 18 under the liquid crystals 7. If an electric field is applied to an appropriately selected combination of the X and Y electrodes, it is possible to obtain a display having a color corresponding to the selected picture element combination.

Figure 8:
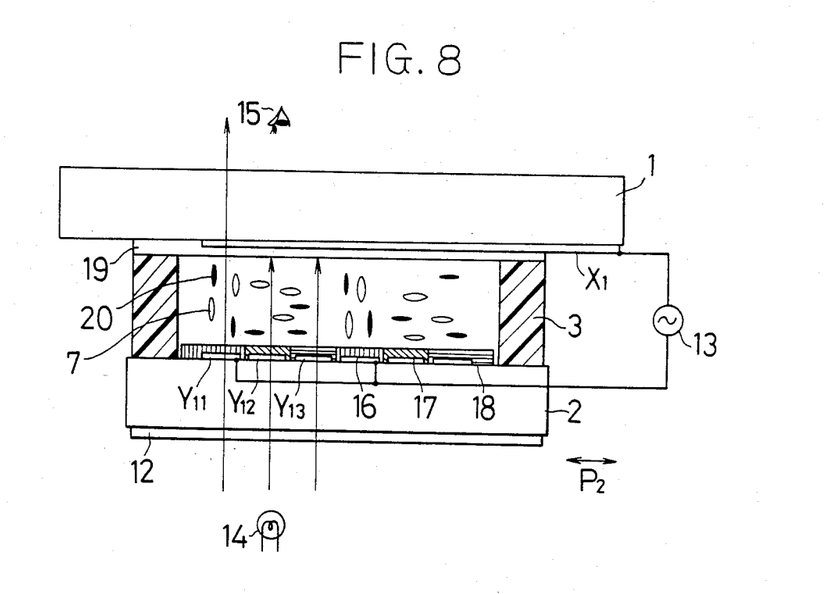
FIG. 8 is a sectional view of a color liquid crystal display device comprising a liquid crystal cell having a matrix electrode structure according to the transmission and a Heilmeier type quest-host system, and including a combined color filter and liquid crystal orientation layer.

Referring to FIG. 8, there is shown a device comprising a liquid crystal cell having a matrix electrode structure according to the transmission and Heilmeier type quest-host system. The same numerals used in FIG. 7 are used in FIG. 8 to indicate like parts. Combined orientation and color filter layers 16 to 18 are formed on the Y electrodes, and an orientation layer 19 on the X electrodes. The liquid crystals 7 in a cell comprise nematic crystals as a host, and a dichroic dye 20 incorporated as a quest, and composed of a mixture of cyanine, Magenta and yellow dyes.

In the absence of any electric field, the cell makes a totally black display, since the liquid crystal molecules remain homogeneously aligned, and the dye 20 achieves the maximum absorption of light. If an electric field is applied to particular picture elements, the corresponding liquid crystal molecules and dye are homeotropically aligned, and it is, therefore, possible to see the colors of the color filters under the liquid crystals 7.

In any of the embodiments shown in FIGS. 5 to 8, it is alternatively possible to provide the combined orientation and color filter layer on the X electrodes. This invention is not limited to a transmission type liquid crystal cell, but is also applicable to a reflective type cell. This invention is not limited to an XY matrix display system, but is also applicable to a segment display system. The number of the applicable colors is not limited to three, but may alternatively be two, or four or more. It is, for example, easy to obtain a display of a bar graph in two or more colors.

The device shown in FIGS. 5 to 8 are simple in construction and inexpensive to fabricate by virtue of the combination of the orientation layer and the color filters. They are, therefore, particularly useful in the fabrication of instruments on a motor vehicle.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A color matrix liquid crystal device comprising in combination;
    (a) a light source,
    (b) a pair of polarizers having a pair of opposing transparent substrates sandwiched therebetween,
    (c) a pair of transparent linear electrodes facing each other provided on each of said substrates to form a matrix electrode structure wherein the intersections of the electrodes define picture elements for display,
    (d) a liquid crystal composition provided between said substrates, and
    (e) transparent layers for orientation of said liquid crystal composition formed over the surface of each of said electrodes, each of said orientation layers being composed of a polyimide resin containing transparent red, green and blue inks, to form a combined color filter and liquid crystal orientation layer, said layer providing red, green and blue (RGB) patterns corresponding to said picture elements.

2. The liquid crystal cell construction of claim 1, in which said polyimide resin is a polyimide siloxane copolymer resin.

3. The liquid crystal cell construction of claim 2, in which said polyimidesiloxane copolymer resin is formed by copolymerizing, in an organic solvent, a diaminosiloxane having the formula (I):

(I)

wherein R is a bivalent organic group, R' is a monovalent, organic group and x is an integer from 1 to 4, with a diamine having the formula (II):

(II)

wherein Q is a bivalent organic group free from silicon atom, and a tetracarboxylic acid dianhydride having the formula (III):

(III)

wherein R" is a tetravalent organic group, to yield a polyamido acid-siloxane copolymer resin, and subjecting said copolymerized resin to internal condensation under heating.

4. The color matrix liquid crystal display device of claim 1, wherein one of said transparent electrodes comprises a scanning electrode and the other of said transparent electrodes comprises a signal electrode.

* * * * *